Patented June 12, 1945

2,378,147

UNITED STATES PATENT OFFICE 2,378,147

PROCESS FOR THE PREPARATION OF A MIXTURE CONTAINING SODIUM BICARBONATE

Walter McGeorge, Kingston Hill, and Francis Highland Milner, Twickenham, England No Drawing. Application July 23, 1940, Serial No. 347,038. In Great Britain August 25, 1939

2 Claims. (Cl. 167—72)

Bicarbonate of soda is usually prepared either by passing carbon dioxide into a solution of sodium carbonate or by the ammonia-soda process. The materials so produced are somewhat coarse crystalline powders. If a finer product is required the coarse crystalline powder is ground but some decomposition to sodium carbonate takes place due to the heat generated in the grinding operation. The present invention has for its object to obviate the grinding operation and to enable the production of an extremely finely divided product which is substantially free from sodium carbonate.

For the treatment of stomach disorders use is frequently made of a sodium bicarbonate in admixture with the insoluble carbonate salts of one or more of the elements calcium, magnesium and bismuth. In such a mixture, it is desirable that the product should be uniform throughout and hitherto this desideratum has involved preparing the individual components in the required degree of fineness and thereafter blending them mechanically with great care and in the appropriate proportions.

It is a further object of the present invention to provide an improved process whereby such a mixture can be prepared in the requisite fine subdivision and in intimate admixture, with partial or complete elimination of the mechanical blending.

Essentially, the invention resides in the precipitation of sodium bicarbonate from an aqueous solution containing not less than 3 grams of sodium bicarbonate per 100 grams of water, preferably at a raised temperature not exceeding 45° C., by admixing therewith from ½ to 3 times the volume of a water-soluble organic solvent such as alcohol.

For producing the above-mentioned mixture of sodium bicarbonate and one or more insoluble carbonates, the latter is or are suspended in the bicarbonate solution prior to the admixture of the water-soluble organic solvent in the precipitation process set out in the immediately preceding paragraph.

In order that the invention may be more readily understood, certain examples will now be given by way of illustration.

Example 1

Sodium bicarbonate is dissolved in water at 30° C. at the rate of 9 grams of sodium bicarbonate in 100 grams (100 c. c.) of water. Twice the volume of ethyl alcohol (industrial spirit) is added to the solution with gentle agitation, i. e. 200 c. c. alcohol for each 100 c. c. water in the solution. The sodium bicarbonate is precipitated in the form of extremely small stout needles which are free from sodium carbonate and are very much smaller in particle size than the material obtained by grinding ordinary sodium bicarbonate. The precipitate is filtered off and dried.

A still finer particle size is obtained by adding the solution of sodium bicarbonate to the ethyl alcohol with vigorous stirring, the conditions being otherwise the same.

Example 2

A substantially saturated solution of sodium bicarbonate in water at 35° C. is prepared and twice the volume of alcohol is added with constant stirring. The mixture is then cooled to below 20° C. and preferably to 10° C., and the precipitate is filtered off and dried.

Example 3

40 grams of calcium carbonate plus 40 grams of magnesium carbonate (basic) plus 10 grams of bismuth carbonate are suspended in 255 c. c. water in which 23.5 grams of sodium bicarbonate are dissolved. 510 c. c. of alcohol (95%) is then slowly added. The product is filtered off and dried at a temperature not above 40° C. It is found to consist of the original suspended insoluble carbonates with each particle coated with the precipitated sodium bicarbonate.

Mixtures of sodium bicarbonate with insoluble carbonate salts of one or more of the elements calcium, magnesium and bismuth can also be prepared by suspending the desired quantity of the selected insoluble carbonate salt or salts in the sodium bicarbonate solution of examples 1 and 2 before the addition of the water-soluble organic solvent. Then, as in Example 3, a precipitate is obtained consisting of the suspended insoluble carbonate salt or salts coated with sodium bicarbonate. The sodium bicarbonate thus presents a large surface area, which results in rapid solution and correspondingly rapid therapeutic action when the mixture is taken medicinally for the treatment of stomach disorders.

If desired, the mixture of sodium bicarbonate with the above-mentioned insoluble carbonate salts may be obtained by precipitating the sodium bicarbonate on one or more of these salts and thereafter blending the precipitate with the remaining salt or salts.

Equally, instead of using the separate insoluble carbonate salts, the mixed precipitate of the carbonate salts of calcium and magnesium obtained by the process described and claimed in copending application No. 347,037 may be taken and suspended in the sodium bicarbonate solution before the addition of alcohol or the like in the process according to the present invention.

It is well known, that sodium bicarbonate as available commercially usually contains a small quantity of sodium carbonate even in the case of pharmaceutical sodium bicarbonate. It has been found, that in spite of this presence of sodium carbonate in the starting material, the finely divided precipitated sodium bicarbonate as prepared by the present process is substantially free from sodium carbonate.

We claim:

1. A process for the preparation of a medicinal preparation consisting of a mixture of sodium bicarbonate and at least one of the insoluble carbonate salts of the elements selected from the group consisting of calcium, magnesium and bismuth, comprising the steps of preparing an aqueous solution of sodium bicarbonate containing not less than 3 grams of sodium bicarbonate per 100 grams of water at a raised temperature not exceeding 45° C., suspending at least one of the insoluble carbonates in the sodium bicarbonate solution, and admixing with said solution from ½ to 3 times the volume of alcohol, and recovering the precipitate.

2. A process for the preparation of a medicinal preparation consisting of a mixture of sodium bicarbonate and at least one of the insoluble carbonate salts of the elements selected from the group consisting of calcium, magnesium and bismuth, comprising the steps of preparing an aqueous solution of sodium bicarbonate containing not less than 3 grams of sodium bicarbonate per 100 grams of water at a raised temperature not exceeding 45° C., suspending at least one of the said insoluble carbonate salts in the sodium bicarbonate solution, and admixing therewith from ½ to 3 times the volume of a water-soluble organic solvent, whereafter the precipitate is recovered.

WALTER McGEORGE.
FRANCIS H. MILNER.